United States Patent [19]

Pfefferle et al.

[11] Patent Number: 5,660,043
[45] Date of Patent: Aug. 26, 1997

[54] TORCH ASSEMBLY

[75] Inventors: William C. Pfefferle, Middletown, N.J.; E. Jack Sweet, Trumbell, Conn.

[73] Assignee: Precision Combustion, Inc., New Haven, Conn.

[21] Appl. No.: 317,378

[22] Filed: Oct. 4, 1994

Related U.S. Application Data

[63] Continuation-in-part of Ser. No. 227,596, Apr. 14, 1994, abandoned, Ser. No. 227,599, Apr. 14, 1994, Ser. No. 197,931, Feb. 17, 1994, Pat. No. 5,593,299, and Ser. No. 835,556, Feb. 14, 1992, Pat. No. 5,453,003.

[51] Int. Cl.$^6$ ............................................. F02C 7/264
[52] U.S. Cl. ............................... 60/723; 60/39.822
[58] Field of Search ........................ 60/39.822, 39.826, 60/723, 39.828; 431/7, 170, 268

[56] References Cited

U.S. PATENT DOCUMENTS

| 2,784,553 | 3/1957 | De Corso et al. | 60/39.826 |
| 3,355,885 | 12/1967 | Toone | 60/39.822 |
| 4,455,822 | 6/1984 | Bayle-Laboure | 60/39.826 |

OTHER PUBLICATIONS

Lefebvre, Arthur H. *Gas Turbine Combustion.* New York, N.Y.: McGraw-Hill, 1983. pp. 454, 455.

*Primary Examiner*—Louis J. Casaregola
*Attorney, Agent, or Firm*—Kane, Dalsimer, Sullivan, Kurucz, Levy, Eisele and Richard

[57] ABSTRACT

The conventional gas turbine combustor is improved by mounting a pilot flame producing torch in a wall of the combustor to project a flame into the combustor as a means of ignition. The torch preferably is a catalytic igniter which will operate over a wide range of air/fuel ratios.

10 Claims, 1 Drawing Sheet

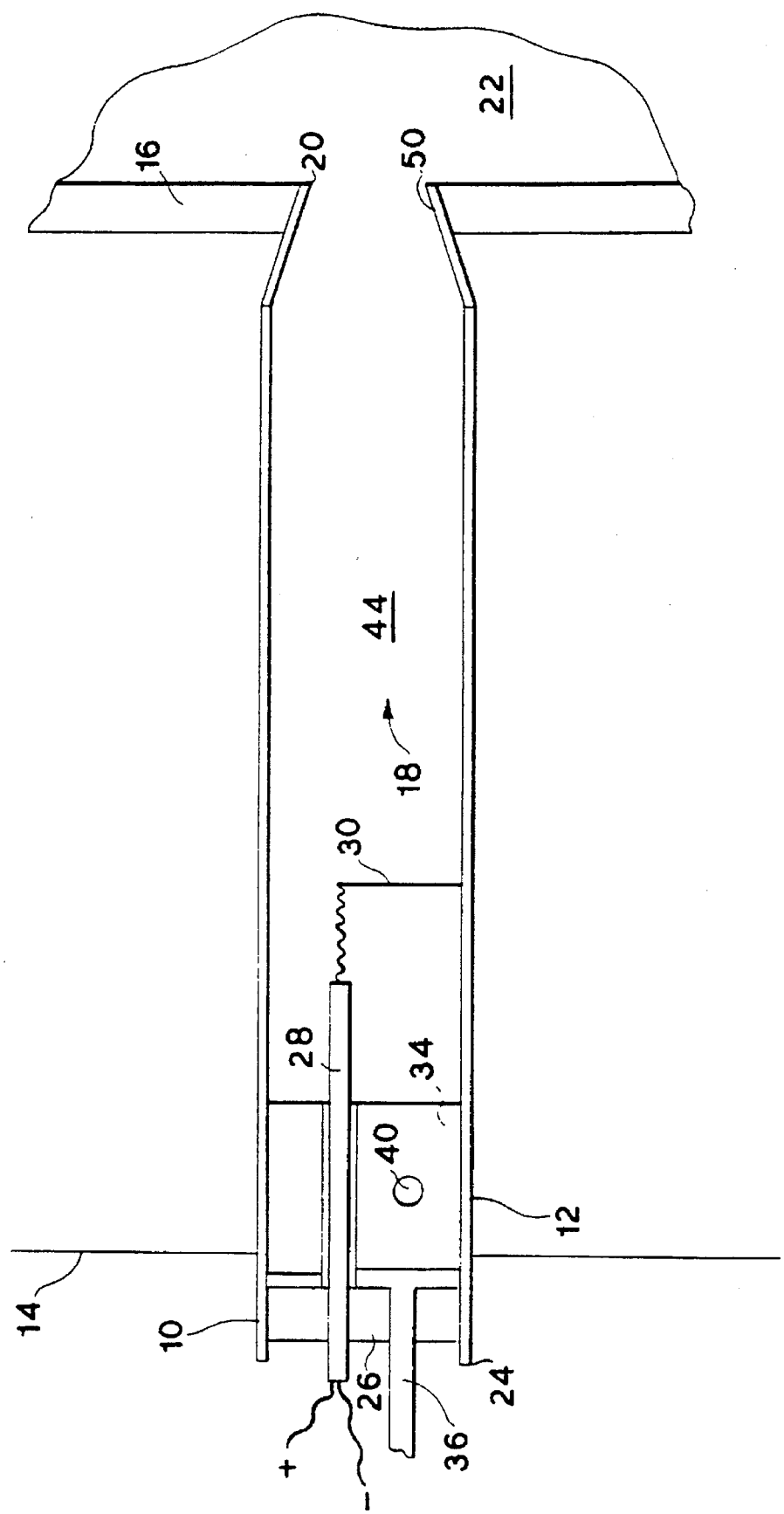

TORCH ASSEMBLY

CROSS-REFERENCE TO RELATED APPLICATIONS

This application is a continuation-in-part of U.S. patent applications Ser. No. 08/227,596 filed Apr. 14, 1994 (abandoned); Ser. No. 08/227,599 filed Apr. 14, 1994; Ser. No. 197,931 filed Feb. 17, 1994 (U.S. Pat. No. 5,593,299) and Ser. No. 835,556 filed Feb. 14, 1992 (U.S. Pat. No. 5,453,003).

BACKGROUND OF THE INVENTION

1. Field of the Invention

The invention relates to an assembly for ignition of gas turbine combustors. In addition, this invention relates to devices for continuous stabilization/re-ignition of lean low $NO_x$ combustion. This invention also relates to igniters for use in place of conventional spark plug fuel ignition systems.

2. Brief Description of Related Art

Commercial aircraft gas turbine combustors utilize combustor wall mounted igniters, typically a spark plug, for combustor light-off. This requires the presence of fuel close to the wall. Inasmuch as combustion of fuel near the wall during full power operation tends to raise the wall temperature, combustor designs tend to be a compromise between ignition and operational requirements. Thus there have been numerous attempts to achieve ignition away from the wall. Ideally, ignition should be achieved right at the fuel source so that ignition of the initial fuel flow is possible. This avoids the necessity to dump unburned fuel into the combustor prior to ignition (creating the potential for hot starts or explosive detonations with consequent damage to the turbine) and enables the use of spray patterns which keep fuel away from the combustor walls.

Accordingly, there has been interest in integrating the ignition source into the fuel injector. For example, U.S. Pat. No. 4,938,019 describes a fuel nozzle with an integrated spark plug igniter assembly and U.S. Pat. No. 4,825,658 describes a fuel nozzle with a catalytic glow plug igniter assembly. Such designs have major drawbacks which limit utility. For example, a spark plug integrated into an injector is subject to fouling if wetted by liquid turbine fuel, rendering it inoperative. In addition, size limitations reduce spark plug life. On the other hand, although the glow plug of U.S. Pat. No. 4,825,658 eliminates the fouling problem of spark plugs, the glow plug is designed such that the return flow of the recirculating flow downstream of the injector contacts the hot glow plug surface resulting in ignition of the downstream recirculating gases. Inasmuch as the initial direction of the incoming fuel-air flow from the swirler is away from the glow plug considerable fuel can travel downstream before sufficient fuel is injected to increase the recirculation zone fuel concentration high enough at the glow plug to allow ignition. Thus explosive detonation is possible as is the case with conventional spark igniters presently used in aircraft gas turbine engines. Advantageously, fuel should be ignited immediately as it enters the combustor.

In the present invention atomized fuel entering a gas turbine combustor is reliably ignited as it enters the combustor by contact with a continuous pilot flame projected into the combustor distal to the combustor walls, at a location to ignite the incoming fuel. The present invention offers the advantages of away-from-the-wall ignition coupled with continuous flame stabilization by providing for projection of the pilot flame into a combustor, whether from the liner wall or from the combustor centerline.

SUMMARY OF THE INVENTION

The invention comprises a torch assembly for ignition of fuel in admixture with air within a gas combustor, which comprises;

a tubular chamber containing a hot surface igniter, means for atomizing fuel into admixture with air, a combustion zone, and an exit opening for projection of a resulting pilot flame into a combustor.

BRIEF DESCRIPTION OF THE DRAWING

The drawing shows a partial cross-sectional side-view of an embodiment catalytic igniter/flame stabilizer torch assembly of the invention having an axially mounted hot surface ignitor.

DETAILED DESCRIPTION OF THE PREFERRED EMBODIMENTS OF THE INVENTION

Those skilled in the art will gain an appreciation of the invention from reading the following description of the preferred embodiments of the invention in conjunction with a viewing of the accompanying drawing. With reference to the drawing, which is a cross-section in part of an embodiment assembly of the invention as seen from the side, there is seen a torch assembly 10 of the invention. The assembly 10 of the invention comprises a tube 12 shown mounted in an aperture through the enclosure 14 and inner liner 16 of a gas turbine combustor. The tube 12 defines a lumen or space 18 with an open end 20 providing entry into the combustion chamber 22 of the combustor. Gas turbine combustors can be constructed in a variety of configurations and with a variety of materials. Representative of gas turbine combustors are those described for example in the U.S. Pat. No. 3,975,141 which is incorporated herein by reference thereto. The opposite end 24 of tube 12 is shown on the exterior of the combustor and is closed by the plug 26. Passing through plug 26 is an electrode 28 connected to an electrical power source exterior to the combustor (power source not shown in the drawing). The electrode 28 is electrically connected to a wire resistor heating element 30 and grounded to the casing of tube 12 which may be constructed of metal such as stainless steel or the like. In the preferred embodiment assemblies 10 of the invention, element 30 is either an oxidation catalyst supporting resistance heater or an electrically conductive metal oxidation catalyst component. For example, the element 30 can be a 0.045 mm Hast-X resistive wire coated with any ignition catalyst known in the art which is reactive with the fuel to be ignited. For example, a support coated with an oxidation catalyst such as a metal from the group VIII of the periodic table of elements and the like. Most preferably, for long life and durability, the element 30 is itself a metal catalyst to provide, in operation, a hot ignition catalyst surface. Platinum group metal containing catalysts such as an oxide hardened platinum metal are preferred because of their high activity with a wide variety of fuels and resistance to the effects of sulfur in the fuel. Advantageously, the element 30 is made from a platinum metal thus eliminating the need for a separate catalyst coating. The temperature of the element 30 is most readily monitored and controlled by measurement of element 30 resistance, but other temperature sensing devices such as thermocouples, infrared detectors and laser beam sensors may be used to monitor the temperature achieved with the element 30. As shown in the drawing, the element 30 is positioned axially within the tube 12 lumen or space 18 at a point between the tube ends 20, 24 and spaced inwardly of open end 20. The element 30 need not, of course, be in any particular shape or configuration, so long as it presents a surface for contact with and ignition of hydrocarbon fuels. The terms "fuel" and "hydrocarbon" as used in the present invention not only refer to organic compounds, including conventional liquid and gaseous fuels, but also to gas streams containing fuel values in the form of compounds such as carbon monoxide, organic compounds or partial oxidation products of carbon containing compounds. Advantageously, the element 30 surfaces are catalytic igniters for oxidation of fuel and the surface remains at a temperature high enough for continuous ignition of entering fuel without the need for electrical power during operation, thus providing assurance against combustor flameout and enabling stabilization of very lean combustion, even beyond the normal lean limit of the combustor in which the assembly 10 is installed. A non-catalytic igniter can be maintained at an effective temperature for continuous ignition by heat from the combustion zone. For combustor light-off, the element 30 may be heated electrically by passage of a current or by such means as inductive heating. Although a smooth surface element 30 may be used, it has been found that elements 30 with flow through gas channels, as for example slots, are advantageous particularly at higher air flow velocities associated with an air blast fuel injector, to be described more fully hereinafter. The element 30 can therefore be in the configuration of a slotted bar, tube or like structure in addition to being a solid wire or ribbon. Annularly disposed about the electrode 28 and proximal to plug 26 is an atomizer 34 which may be an air blast type of nozzle or pressure atomizer, preferably an air swirler, for injecting fuel/air mixtures into contact with the element 30. Any of the known liquid fuel atomizers may be employed. Preferred as a means of atomizing liquid fuels and homogeneously mixing the atomized fuel with air in all ratios are the devises known as swirlers.

Fuel enters the tube 12 through inlet conduit 36 and is carried to atomizer 34 through plug 26. In the atomizer 34 the fuel is atomized and carried in an air mixture (the air being introduced into atomizer 34 through port 40 fed by the turbine compressor; the compressor is not shown in the drawing) into downstream contact with the element 30. The air admixed, atomized fuel is ignited by contact with the hot surface of element 30.

Combustion of ignited fuel is stabilized in combustion zone 44 by the swirl generated by air atomizer 34. Continuous ignition provided by element 30 allows stable combustion even with lean fuel-air admixtures. Combusting gases are accelerated by the pressure of incoming air/fuel swirl, exiting combustion zone 44 by passage through nozzle 50, thus providing a high velocity ignition torch. A restrictive nozzle 50 at end 20 is not necessary, but preferred for increasing the velocity of the exiting flame. This enhances the projection of the flame into the combustion chamber 22 away from the combustor walls. Torches of the present invention may be operated with either lean or rich fuel-air mixtures as dictated by requirements of the combustor in which it is used.

In operation of an assembly 10 of the present invention, fuel is atomized and mixed with air and passed into a combustion zone 44, a portion of the entering fuel contacting a hot ignition surface, thus providing continuous ignition of entering fuel. Such continuous ignition allows operation of the assembly 10 much closer to its lean limit than would otherwise be prudent because of the danger of a flameout. With proper placement and sizing of a catalytic torch, operation below the natural lean limit is possible. With electrical preheating of the element 30 prior to initial introduction of fuel, light-off can occur without significant delay. Light-off can even be achieved at the combustor lean limit.

The operation of the assembly 10 of the invention can be appreciated by referring again to the drawing.

As shown in the drawing, atomizer 34 provides swirl to the air flowing through port 40 thus generating the shear forces necessary to atomize and mix with fuel entering from conduit 36. The fuel is brought into contact with the hot surface of element 30 by air flowing through atomizer 34 resulting in ignition of fuel during passage into the combustion zone 44. During starting of a gas turbine engine, typically the element 30 is heated to a temperature above the minimum temperature required for ignition at the given air flow condition prior to introduction of fuel thus assuring a rapid light-off. After light-off, electrical power to the element 30 may be controlled to maintain the element 30 temperature below a safe value for the materials used. Typically, electrical heating is discontinued after light-off though continued controlled heating may be utilized to provide near instantaneous relight in those situations where aircraft operation, for example, could result in engine flameout such as by ingestion of water into the engine. Although this invention has been described in terms of an air blast fuel injection, gas turbine fuel nozzles such as pressure atomizers or high shear nozzles can be utilized in the present invention to atomize the fuel.

The resulting flame projected out of the end 20 of tube 12 and into the gas turbine combustor serves as the ignition means for igniting the fuel air mixtures separately injected into the gas turbine combustor. It is a reliable, instant means of ignition.

Those skilled in the art will appreciate that many modification of the preferred embodiment described above can be made without departing from the spirit and scope of the invention.

We claim:

1. A torch assembly for ignition of fuel in admixture with air within a gas turbine combustor, which comprises;
    a tubular chamber;
    a hot surface igniter which comprises an oxidation catalyst contained in the tubular chamber;
    means for atomizing fuel into admixture with air;
    conduit means for carrying the atomized fuel from the means for atomizing fuel, into the tubular chamber;
    electrical means for heating the igniter surface;
    a combustion zone in the tubular chamber between the igniter and an exit opening; and
    an exit opening out of the combustion zone for projection of a resulting pilot flame into a combustor.

2. The assembly of claim 1 wherein said catalyst comprises a platinum metal.

3. The assembly of claim 2 wherein said igniter comprises an oxide hardened platinum metal structure.

4. The assembly of claim 1 wherein the means for atomizing comprises an air blast fuel nozzle.

5. The assembly of claim 1 wherein the means for atomizing comprises a pressure atomizer.

6. The assembly of claim 1 wherein said igniter is mounted coaxially in the tube.

7. A torch assembly for the ignition of air/fuel mixtures in the walled combustion chamber of a gas turbine, which comprises;

a tube defining a tube lumen, positioned within the wall of the combustion chamber, said lumen having a first end and a second end and a first opening into the combustion chamber from the first end, and a closed second end;

means for atomizing fuel in a mixture with air, mounted in the tube lumen, proximal to the second end;

conduit means for delivery of a liquid fuel to the atomizer;

passage means for carrying air to the atomizer;

catalytic hot surface ignition means for igniting atomized fuel/air mixtures, positioned in the lumen between the atomizer and the first opening; and electrical heating means for heating the hot surface.

8. The assembly of claim 7 wherein the means for atomizing fuel comprises a swirler.

9. The assembly of claim 8 wherein the catalytic igniter comprises a platinum metal.

10. The assembly of claim 7 which further comprises means for controlling the temperature of the means for ignition.

* * * * *